United States Patent [19]
Kunikiyo et al.

[11] Patent Number: 5,731,089
[45] Date of Patent: Mar. 24, 1998

[54] PROCESS OF MOLDING A COATED FILM

[75] Inventors: Takumi Kunikiyo; Kyoji Tokiwa, both of Hamamatsu; Yoshikazu Yamamoto, Nishikamo-gun; Tsugio Kato, Nishikamo-gun; Akira Kasari, Nishikamo-gun, all of Japan

[73] Assignees: Kansai Paint Co., Ltd.; Suzuki Motor Corporation, both of Japan

[21] Appl. No.: 551,846

[22] Filed: Nov. 7, 1995

[30] Foreign Application Priority Data

Nov. 7, 1994 [JP] Japan ................... 6-295959

[51] Int. Cl.$^6$ ............ B32B 15/08; B05D 1/36; B05D 3/02; B05D 7/14
[52] U.S. Cl. ................ 428/423.1; 428/423.7; 428/425.9; 428/457; 427/388.4; 427/407.1; 427/410
[58] Field of Search ............ 428/423.1, 423.7, 428/424.2, 424.4, 425.9, 457, 424.8, 425.8, 418; 427/372.2, 384, 385.5, 388.1, 388.4, 407.1, 409, 422, 410

[56] References Cited

U.S. PATENT DOCUMENTS

| | | | |
|---|---|---|---|
| 4,755,435 | 7/1988 | Fujii et al. | 428/461 |
| 4,781,949 | 11/1988 | Kasari | 427/407.1 |
| 5,242,716 | 9/1993 | Iwase et al. | 427/401 |
| 5,288,520 | 2/1994 | Toyoshima et al. | 427/322 |
| 5,326,596 | 7/1994 | Kasari et al. | 427/379 |
| 5,330,796 | 7/1994 | Kasari et al. | 427/407.1 |
| 5,362,521 | 11/1994 | Ozaki et al. | 427/407.1 |
| 5,425,926 | 6/1995 | Kunikiyo et al. | 427/393.5 |

FOREIGN PATENT DOCUMENTS

| | | |
|---|---|---|
| 0 548 845 A1 | 6/1993 | European Pat. Off. |
| 61-120673 | 6/1986 | Japan |
| 06200186 | 7/1994 | Japan |

*Primary Examiner*—John J. Zimmerman
*Attorney, Agent, or Firm*—Wenderoth, Lind & Ponack

[57] ABSTRACT

This invention provides a process to form a coated film characterized in that, after a cationically electrodeposition paint is applied on a metal-made article to be coated and is heat-cured, the surface of the resulting electrodeposition coated film is coated with an aqueous primer, which is mainly composed of such a thermoplastic polyurethane resin as is produced by subjecting a carboxyl group-containing urethane prepolymer to chain extension in the presence of an aqueous medium, and, successively, with an aqueous base paint, and, next, with a clear paint, and that the resulting three-layer coated films are heated and are thereby cured simultaneously. By this process, there can be formed a multi-layer coated film excellent in chipping-resistance, corrosion-resistance, weatherability and physical performances.

28 Claims, No Drawings

PROCESS OF MOLDING A COATED FILM

BACKGROUND OF THE INVENTION

1. Field of the Invention

The present invention relates to a process of forming a multi-layer coated film excellent in chipping-resistance, corrosion-resistance, weatherability and physical performances on metal-made articles to be coated, especially, on automobile bodies.

2. Description of the Prior Art

In the coating of the outside plates of an automobile body, the peeling of the coated film which is caused by impact and which is accompanied by the progress of corrosion in the car body has been a grave problem. In the cold districts of Europe and the U.S.A., for example, gravels mixed with rock salt are sometimes laid on roads so as to prevent them from freezing. When one drives down such a road, there is likely to occur a chipping phenonmenon in which the splashed particles of rock salt collide with the coated surfaces of the car body and peel the coated films off locally. As a result, there is brought about such defects that the appearance is marred, and that the base metal is exposed to accelerate rusting. Although this chipping phenonmenon appears chiefly on the underbody and around the wheels, it also occurs also on the hood or roof.

In order to prevent this chipping, it has been proposed to provide a barrier coated film, mainly composed of a modified polyolefin resin, between the layer of an electrodeposition coated film and the layer of an intercoat film (Japanese Patent Application Laid-Open (Kokai) No. 61-120673=U.S. Pat. No. 4,755,435). Although a preventive effect is shown, a large amount of organic solvent is needed to render the viscosity of said barrier paint suitable for coating. Therefore, the coating method of the above proposal is undesirable from the viewpoint of sanitation, environment preservation, atmospheric pollution, safety and source-saving.

The objective of the present invention is to solve the above-mentioned problems. The inventors have found that this objective can be achieved by forming, between the layer of a cationically electrodeposition coated film and the layer of an aqueous base coated film (solid color- or metallic-coated film), a coated film of aqueous primer which is mainly composed of a thermoplastic polyurethane resin produced by subjecting a carboxyl group-containing urethane prepolymer to chain extension in the presence of an aqueous medium, and, thus, have completed this invention.

SUMMARY OF THE INVENTION

This invention provides a process of forming a coated film which process is characterized in that, after a cationically electrodeposition paint (A) is applied on a metal-made article to be coated and is heat-cured, the surface of the resulting electro-deposition coated film is coated with an aqueous primer (B) which is mainly composed of such a thermoplastic polyurethane resin as is produced by subjecting a carboxyl group-containing urethane prepolymer to chain extension in the presence of an aqueous medium, and the coated film of the aqueous primer (B), without being substantially cured, is then coated with an aqueous base paint (C). Next, the resulting coated film, without being substantially cured, is coated with a clear paint (D), and, further, the three-layer coated films of aqueous primer (B), aqueous base paint (C) and clear paint (D) are simultaneously heat-cured.

In the following, the process of this invention is explained more minutely.

DETAILED DESCRIPTION OF THE INVENTION

Metal-made articles to be coated:

The species of articles to be coated by the process of this invention are not especially limited so long as they are metal-made products which can be coated by cationically electrodeposition coating, such as products made of iron, copper, aluminum, tin or zinc and alloys containing these metals, and products on which said metals or alloys are plated or vapor-deposited. Concrete examples of such articles include bodies of automobiles, trucks, motorcycles and buses which are formed by use of membranes of the above-mentioned metals. It is preferable that these metal-made articles to be coated are previously chemically treated with phosphate or chromate if need be.

Cationically electrodeposition paint (A):

This paint is directly applied on the above-mentioned metal-made articles to be coated. Its species is not strictly restricted, and there can be used any species of cationically electrodeposition paints which are already known. Concrete examples thereof include a paint which is mainly composed of such an aqueous resin produced by neutralizing a basic group-containing resin whose base value is generally in the range of about 30 to about 200, preferably about 40 to about 120, such as epoxy resins, acrylic resins and polybutadiene resins modified with amino group-containing compounds, and which are compounded, if need be, with crosslinking agents (such as blocked polyisocyanates and alicyclic epoxy resins), color pigments, corrosion-resistant pigments, extender pigments or hydrophilic organic solvents. As for the acids used here in as a neutralizing agent, there can be used organic acids, such as acetic acid, hydroxyacetic acid, propionic acid, burytic acid, lactic acid and glycine; and inorganic acids such as sulfuric acid, hydrochloric acid and phosphoric acid. The neutralizing agent is appropriately used within the range of neutral equivalent of about 0.1 to about 0.4 per base value of the above resin.

The above paint is diluted with deionized water so that the concentration of solid contents may fall within the range of about 5 to about 40% by weight, and, then, can be applied by electrodeposition coating by a normal manner with a pH generally kept in the range of 5.5 to 8, especially 5.8 to 7.5. The formed coated film can be cured by heating to, normally, a temperature of about 130° to about 210° C., preferably about 140° to about 180° C. Generally, the thickness of the coated film is preferably in the range of about 10 to about 60µ, especially about 15 to about 40µ, based on the cured coated film.

Aqueous primer (B):

This is a composition for coating which is to be applied on the surface of the above-mentioned cationically electrodeposition coated film which has been heat-cured. This composition is mainly composed of a thermoplastic polyurethane resin produced by subjecting a carboxyl group-containing urethane prepolymer to chain extension in the presence of an aqueous medium.

A preferably used aqueous primer (B) is mainly composed of a self-emulsifying type urethane emulsion obtained by subjecting a free isocyanate group-containing urethane prepolymer to chain extension by water and emulsification after or while neutralizing said urethane prepolymer with a tertiary amine, said urethane prepolymer being produced by allowing an aliphatic and/or alicyclic diisocyanate, b) a polyether diol and/or polyester diol having a number average molecular weight of 500 to 50000, c) a low molecular weight polyhydroxy compound and d) a dimethylol alkanoic acid to react with one another so that NCO/OH equivalent ratio may fall within the range of 1.1 to 1.9.

Thus, said aqueous primer can be produced as follows: a) an aliphatic and/or alicyclic diisocyanate, b) a polyether diol and/or polyester diol having a number average molecular weight of 500 to 50000, c) a low molecular weight polyhydroxy compound and d) a dimethylol alkanoic acid as raw materials are polymerized by a one-shot or multi-stage process so that NCO/OH equivalent ratio may fall within the range of 1.1 to 1.9, especially 1.3 to 1.7, in the presence or absence of a hydrophilic organic solvent which preferably contains no active hydrogen group in molecule, and, thus, a free iso-cyanate group-containing urethane prepolymer is synthesized. Then, after or while neutralizing the carboxyl group in said urethane prepolymer with a tertiary amine, said urethane prepolymer is mixed with water, so that said prepolymer may undergo a chain extension reaction by water, and, at the same time, said prepolymer is emulsified and dispersed in water, and, if necessary, the abovementioned organic solvent is distilled off.

The average particle size of thus prepared polyurethane particulate resin emulsified and dispersed in water is normally preferably in the range of about 0.001 to about 1μ, especially about 0.005 to about 0.05μ.

Examples of the aliphatic and alicyclic diisocyanate (a) usable for the preparation of this urethane prepolymer include aliphatic diisocyanates which have 4 to 14 carbon atoms, not including the carbon atoms in the isocyanate group, such as hexamethylene diisocyanate, 2,2,4-trimethylhexane diisocyanate, lysine diisocyanate; alicyclic diisocyanates which have 5 to 20 carbon atoms, not including the carbon atoms in isocyanate group, such as 1,4-cyclohexane diisocyanate, 1-isocyanate-3-isocyanate methyl-3,5,5-trimethylcyclohexane (isophoronediisocyanate), 4,4'-dicyclohexylmethane diisocyanate, methylcyclohexylene-diisocyanate, isopropylidene cyclohexyl-4,4'-diisocyanate; and modified materials of these diisocyanates (such as carbodiimide-, ureidodione- and ureidoimine-derivatives thereof). These can be used separately or in combination of two or more species. Especially preferable among them are alicyclic diisocyanate such as 1,4-cyclohexane diisocyanate, 1-isocyanate-3-isocyanate methyl-3,5,5-tri-methylcyclohexane and 4,4'-dicyclohexylmethane-diisocyanate. Aromatic diiso-cyanate is undesirable as a diisocyanate component since, when it is used, the coated film tends to yellow when heat-cured, and since the shade of the coated film is liable to be changed under the influence of ultraviolet ray.

The diol component (b) which is usable for the preparation of the urethane prepolymer is a polyether diol and/or polyester diol having a number average molecular weight in the range of 500 to 50000, preferably 1000 to 30000, more preferably 1500 to 15000.

Examples of said polyether diols include such compounds obtained by subjecting an alkylene oxide (e.g., ethylene oxide, propylene oxide, butylene oxide, etc.) and/or heterocyclic ether (e.g., tetrahydrofuran) to polymerization or (block or random) copolymerization. Concretely, there can be employed polyethylene glycols, polypropylene glycols, (block or random) poly(ethylene propylene)glycols, polytetramethylene ether glycols, polyhexamethylene ether glycol and polyoctamethylene ether glycols.

Examples of polyester diols include such compounds obtained by condensing aliphatic or aromatic dicarboxylic acid (e.g., adipic acid, succinic acid, sebacic acid, gluteric acid, maleic acid, fumaric acid and phthalic acid) with glycol (e.g., ethylene glycol, propylene glycol, 1,4-butanediol, 1,6-hexanediol, 3-methyl-1,5-pentanediol, neopentylglycol, bishydroxymethylcyclohexane, etc.). Concretely, there can be employed polyethylene adipate, polybutylene adipate, polyhexamethylene adipate, polyneopentyl adipate, poly-3-methylpentyl adipate, polyethylene/butylene adipate, polyneopentyl/hexyl adipate, and, furthermore, there can be used polylactone diols (e.g., polycaprolactone diol, poly-3-methylvaleronitrile lactone diol, etc.) and polycarbonate diol.

Especially preferable, among the above mentioned compounds, as diol component b) are polybutylene adipate diols, polycaprolactone diols, polypropylene glycols and polytetra-methylene glycols.

The low molecular weight polyhydroxy compound c) which is usable for the preparation of the urethane prepolymer has a number average molecular weight of less than 500, especially in the range of 62 to 250, and has at least two, preferably 2 to 10, more preferably 2 to 3, hydroxyl groups in one molecule. Examples of such a compound include the glycols, which are mentioned above as raw materials of the above polyester diols, and low-molar adducts of alkylene oxide (whose number average molecular weight is less than 500); and trihydric alcohol (e.g., glycerin, trimethylol ethane, trimethylol propane, etc.) and low-molar adducts of trihydric alcohol with alkylene oxide (whose number average molecular weight is less than 500). These compounds can be used in combination of two or more species. These low molecular weight polyhydroxy compounds are normally used in 0.1 to 20% by weight, preferably 0.5 to 10% by weight, based on the diol component.

The dimethylol alkanoic acid d) which is usable for the preparation of urethane prepolymer is a compound having two methylol groups and one carboxylic group in the molecule. Examples of such a compounds include dimethylol acetic acid, dimethylol propionic acid and dimethylol butyric acid. Among these, dimethylol propionic acid is especially preferable. The dimethylol alkanoic acid is preferably used in such an amount that the amount of carboxylic group may fall within the range of 0.5 to 5% by weight, especially 1 to 3% by weight, in the formed prepolymer. When the content of carboxylic group is less than 0.5% by weight, the stability of the emulsion lowers, while, when said content is more than 5% by weight, hydrophilicity is enhanced, the viscosity of the emulsion is increased, and, sometimes, water resistance is decreased. Said carboxylic group is useful to increase the adhesion with the cationically electrodeposition coated film and the intercoat film.

Examples of the tertiary amine used for neutralizing the carboxylic group, based on the dimethylol alkanoic acid in the urethane prepolymer, include a trialkyl amine such as trimethyl amine, triethyl amine, triisopropyl amine, tri n-propyl amine and tri n-butyl amine; N-alkylmorpholine such as N-methyl morpholine and N-ethyl morpholine; and N,N-dialkyl alkanol amine such as N,N-dimethylethanol amine and N,N-di-ethylethanol amine. These are used alone or in combination of two or more species. Among them, tri($C_1$–$C_{10}$ alkyl)amine, such as triethyl amine is preferable. The amount of tertiary amine used for neutralization is normally in the range of 0.5 to 1 equivalent, preferably 0.7 to 1 equivalent, per equivalent of carboxylic group based on the dimethylol alkanoic acid.

The aqueous primer (B) may include an organic solvent, an extender pigment, a color pigment, an ultraviolet ray absorbent, an antioxidant and a surfactant, when needed.

The aqueous primer (B) can be applied by various normal methods. However, it is preferably applied by spray coating.

The thickness of the coated film is preferably within the range of 1 to 20μ, especially 5 to 15μ, based on the dry coated film. In the process of this invention, after said aqueous primer is applied, the formed coated film is preferably air-dried at room temperature by means of air blow without being substantially cured, or without being heated to a high temperature for example, and, then, is coated with the following aqueous base paint.

Aqueous base paint (C):

This paint is applied on the coated film of aqueous primer which is formed in the above-mentioned manner, with a view to imparting a beautiful appearance to the article to be coated. Examples of this paint include a known water-soluble or water-dispersible paint such as a metallic paint, which is mainly composed of an aminoacrylic resin type-, an aminoalkyd resin type- or an aminopolyester resin type-thermosetting resin composition, and which is compounded with a pigment such as a color pigment and a metallic pigment, if necessary.

The aqueous base paint (C) can be applied by conventional methods. However, it is preferably applied by spray coating. The thickness of the coated film is preferably within the range of 5 to 30μ, especially 10 to 20μ, based on the dry coated film. In the process of this invention, after said aqueous base paint is applied, the formed coated film is preferably air-dried at room temperature by means of air blowing without being substantially cured, or without being heated to a high temperature for example, and, then, is coated with the following clear paint.

In the process of this invention, after said aqueous primer (B) and aqueous base paint (C) are applied by wet-on-wet coating, the resulting two coated films may be heated and dried simultaneously. The heating condition is not especially limited, and can be varied according to the species of the used aqueous primer (B) and aqueous base paint (C). Normally, however, said two coated films are preferably heated at a temperature in the range of 60° to 100° C., especially 65° to 95° C., for about 5 to 30 minutes, and are dried without being crosslinked.

Clear paint (D):

This paint is applied on the uncured coated surface of the above-mentioned aqueous base paint with a view to imparting a beautiful appearance, a finished appearance, weatherability, chemical resistance, water resistance and humidity resistance to the multi-layer coated film to be formed. To achieve these results, there can be used paints which form a colorless or colored transparent coated films. Concrete examples of this paint include already known water-soluble or water-dispersible paints which are mainly composed of areinc acrylic resin type-, amino alkyd resin type- or amino poly-ester resin type-thermosetting resin compositions, and which are, in case of need, compounded with color pigments or metallic pigments in such a degree that transparency is not damaged.

This clear paint can also be applied by various normal methods. Generally, however, it is preferably applied by spray coating. The thickness of the coated film is preferably within the range of 20 to 80 μ, especially 30 to 50μ, based on the cured coated film.

In the process of this invention, the aqueous primer (B), the aqueous base paint (C) and the clear paint (D) are applied on top of one another in the abovementioned manner so as to form a three-layer coated film, which is, after being allowed to stand at room temperature if necessary, heated at a temperature in the range of about 100° to about 160° C., especially about 120° to about 150° C., normally for about 20 to about 40 minutes, so that said three layers of coated films may be simultaneously cured.

When an external force is imparted to the multi-layer coated film prepared by the process of this invention, the aqueous primer coated film which forms a high molecular weight film having urethane bonds absorbs the impact energy. Besides, since said aqueous primer coated film has carboxyl group as a functional group, the film shows good adhesion to the cationically electrodeposition coated film and to the aqueous base coat, and, thus, chipping resistance is remarkably improved.

In the following, this invention is further concretely explained by Examples and Comparative Examples.

I. Sample preparation:

1) Cationically electrodeposition paint (A):

(A-1): "ELECRON #9200" (trade name of block polyisocyanate-type polyamine-modified epoxy resin made by KANSAI PAINT CO., LTD.) was diluted with a deionized water or the like so that the concentration of solid content might be about 16% by weight, and, then, was applied by normal electrodeposition process with pH kept within the range of 5.5 to 8.0. The thickness of the coated film was about 20μ based on the cured coated film, and the film was cured by heating to a temperature of about 175° C.

2) Aqueous primer (B):

(B-1): A polymerization vessel was charged with 115.5 parts (by weight; the same shall apply hereinafter) of polybutylene adipate diol having a number average molecular weight of 2000, 115.5 parts of polycaprolactone diol having a number average molecular weight of 2000, 23.2 parts of dimethylol propionic acid, 6.5 parts of 1,4-butane diol and 120.1 parts of 1-isocyanate-3-isocyanatemethyl-3,5,5-trimethylcyclohexane, and the mixture was made to react with stirring in a nitrogen gas atmosphere at 85° C. for seven hours, and, thus, there was obtained an NCO-terminated prepolymer having an NCO group content of 4.0%. Next, this prepolymer was cooled to 50° C., and, then, there was added 165 parts of acetone, in which the prepolymer was uniformly dissolved. Then, 15.7 parts of triethyl amine was added with stirring, and, moreover, 600 parts of ion-exchanged water was added with the temperature kept at 50° C. or less, and the obtained water dispersion was maintained at 50° C. for two hours so that the reaction of chain extension by water might be completed, and, thus, there was prepared an aqueous primer having a solid content of 42%.

(B-2): A pressurizing polymerization vessel was charged with 115.5 parts of polypropylene glycol having a number average molecular weight of 2100, 115.5 parts of polytetramethylene ether glycol having a number average molecular weight of 2000, 23.2 parts of dimethylol propionic acid, 6.7 parts of trimethylol propane, 141.7 parts of 4,4'-dicyclohexylmethane diisocyanate and 141.7 parts of acetone, and, after the gas in the reaction system was substituted with nitrogen gas, the resulting mixture was made to react, with stirring, at 85° C. for five hours, and, thus, there was obtained an NCO-terminated prepolymer in acetone solution having an NCO group content of 2.6%. Then, there was prepared an aqueous primer having a solid content of 42% in the same manner as in (B-1) mentioned above.

3) Aqueous base paint (C):

Preparation of acrylic resin:

A reactor was charged with 140 parts of deionized water, 2.5 parts of 30% (by weight; the same shall apply hereinafter) "NEWCOL 707SF" (the tradename of surfactant made by NIPPON NYUKAZAI CO., LTD.) and one part of the following monomeric mixture (1), and the resulting mixture was blended with stirring in a gas flow of nitrogen, and, then, there was added 3 parts of 3% aqueous solution of ammonium persulfate at 60° C. Then, after the temperature was raised to 80° C., a monomeric emulsion comprising 79 parts of the following monomeric mixture (1), 2.5 parts of 30% "NEWCOL 707SF", 4 parts of 3% aqueous solution or ammonium persulfate and 42 parts of deionized water was added to the reactor by use of a constant delivering pump; the addition taking four hours. After the addition was over, the emulsion was aged for one hour. Moreover, at a temperature of 80° C., 20.5 parts of the following monomeric mixture (2) and 4 parts of 3% aqueous solution of ammonium persulfate were simultaneously introduced dropwise, parallel to each other, into the reactor; the introduction taking 1.5 hour. After the introduction was over, the resulting mixture was aged for one hour, and was diluted with 30 parts of deionized water, and, then, was filtered through 200-mesh nylon cloth at 30° C. Deionized water was further added to the filtrate, whose pH was adjusted to 7.5 with use of dimethyl aminoethanol, and, thus, there was obtained a water dispersion of acrylic resin having an average particle size of 0.1μ and a nonvolatile content of 20%.

| Monomeric mixture (1) | |
|---|---|
| methyl methacrylate | 55 parts |
| styrene | 10 parts |
| n-butyl acrylate | 9 parts |
| 2-hydroxyethyl acrylate | 5 parts |
| methacrylic acid | 1 part |
| Monomeric mixture (2) | |
| methyl methacrylate | 5 parts |
| n-butyl acrylate | 7 parts |
| 2-ethylhexyl acrylate | 5 parts |
| methacrylic acid | 3 parts |
| 30% "NEWCOL 707SF" | 0.5 part |

Preparation of melamine resin:

A 2-liter four-necked flask equipped with thermometer, stirrer and reflux condenser,was charged with 126 parts of melamine, 225 parts of 80% paraformalin (made by MITSUI TOATSU CHEMICALS, INC.) and 592 parts of n-butanol. After the pH was adjusted to 9.5 to 10.0 with use of 10% aqueous solution of caustic soda, the resulting mixture was allowed to react at 80° C. for one hour. Then, 888 parts of n-butanol was added, and, after pH was adjusted to 5.5 to 6.0 with use of 5% aqueous solution of sulfuric acid, the resulting mixture was allowed to react at 80° C. for three hours. After the reaction was over, the mixture was neutralized to a pH of 7 to 7.5 by use of a 20% aqueous solution of caustic soda, and, then, n-butanol was subjected to vacuum concentration at 60° to 70° C., and, by means of filtration, there was obtained a hydrophobic melamine resin which had a nonvolatile content of 80% and a weight average molecular weight of 800. This melamine resin was introduced into a stirring vessel so that solid content might be 25 parts, and there was added 20 parts of acrylic resin in aqueous solution (50% aqueous solution of resin comprising n-butyl acrylate, methyl methacrylate, styrene, 2-hydroxyethyl methacrylate and acrylc acid). While the resulting mixture was stirred by a Disper having a number of revolutions of 1000 to 1500, 80 parts of deionized water was gradually added, and, then, the mixture was further stirred and dispersed in water for 30 minutes. There was thus prepared an aqueous dispersion of melamine resin having an average particle size of 0.11μ.

Preparation of aqueous base paint (C-1):

There were blended 325 parts of an aqueous dispersion of acrylic resin, 131.3 parts of an aqueous dispersion of melamine resin, 48 parts of an concentrated solution of aluminum pigment (See: Note), 171.3 parts of deionized water, 2.9 parts of an "AQUASOL ASE-60" (thickening agent made by Rohm & Haas Co.) and 0.27 parts of dimethyl aminoethanol, and, thus, there was prepared an aqueous metallic base paint.

(Note) A vessel for stirring and blending was charged with 23 parts of aluminum paste (metal content: 65%) and 25 parts of butyl cellosolve, and, then, the resulting mixture was stirred for one hour, and, thus, there was obtained a concentrated solution of aluminum pigment.

Preparation of clear paint (D):

(D-1): In xylene, there were polymerized 25 parts of methyl methacrylate, 25 parts of ethyl acrylate, 36.5 parts of n-butyl acrylate, 12 parts of 2-hydroxyethyl acrylate, 1.5 part of acrylic acid and 2.5 parts of polymerization initiator (α-α'-azobisisobytyronitrile), and, thus, there was prepared a solution of acrylic resin which had a resin solid content of 60%. Said resin had a hydroxyl value of 58 and an acid value of 12. This resin was mixed with "U-Van 20 SE" (hydrophobic melamine resin made by MITSUI TOATSU CHEMICALS, INC. having a nonvolatile content of 60% and a weight average molecular weight of 3000 to 4000) so that weight ratio of solid content might be 75:25, and, then, an organic solvent was added so that viscosity might be 25 seconds (Ford cup #4/20° C.).

II. Examples and Comparative Example

Example 1

A steel plate whose surface had been treated with "PALBOND #3030" (a treating agent of phosphate made by NIHON PARKERRINZING CO., LTD.) was dipped in a bath of cationically electrodeposition paint (A-1), and was coated by normal electrodeposition process. The thickness of the coated film was about 20μ based on the cured film. After taken out of the bath and was washed with water, the plate was heated to about 175° C. so that the coated film might be cured.

Then, an aqueous primer (B-1) whose viscosity had been adjusted to 25 seconds (Ford cup #4/20° C.) was applied on the cured surface of said electro-deposition coated film by an air spray coating so that the thickness of the primer might be about 20μ based on the cured film, and, then, the plate was allowed to stand at room temperature for about 10 minutes.

Thereafter, an aqueous base paint (C-1) whose viscosity had been adjusted to 25 seconds (Ford cup #4/20° C.) was applied on the uncured surface of said aqueous primer (B-1) by air spray coating so that the thickness of the aqueous base paint might be about 15μ based on the cured film, and, then, the plate was allowed to stand at a room temperature for about five minutes. Next it was heated at 80° C. for 30 minutes so that the coated films of said aqueous primer (B-1) and the aqueous base paint (C-1) might be simultaneously dried.

Then, clear paint (D-1) whose viscosity had been adjusted to 25 seconds (Ford cup #4/20° C.) was applied on the dried surface of the coated film of said aqueous base paint (C-1) by air spray coating so that the thickness of the coated film of the clear paint might be about 40μ based on the cured film, and, then, the plate was allowed to stand at a room temperature for about five minutes, and, thereafter, was heated at 140° C. for 30 minutes so that the three layers of coated films of said aqueous primer (B-1), the aqueous base paint (C-1) and the clear paint (D-1) might be simultaneously crosslinked and cured.

Example 2

Example 1 was repeated except that aqueous primer (B-1) was replaced with (B-2).

Comparative Example

Example 1 was repeated except that coating of aqueous primer (B-1) was omitted.

III. Results of performance test

The multi-layer coated films obtained in the above Examples and Comparative Example were subjected to performance test. The results are shown in Table 1.

TABLE 1

|  | Examples | | Comparative Example |
|---|---|---|---|
|  | 1 | 2 | 1 |
| Coating process | | | |
| Electrodeposition paint | (A-1) | (A-1) | (A-1) |
| Aqueous primer | (B-1) | (B-2) | — |
| Aqueous base paint | (C-1) | (C-1) | (C-1) |
| Clear paint | (D-1) | (D-1) | (D-1) |
| Results of performance test | | | |
| Chipping resistance | o | o | x |
| Corrosion resistance | o | o | x |
| Weatherability | o | o | x |

Test method

Chipping resistance:

A gravelometer (made by Q-PANEL CO., LTD.) was used as a tester, and 500 g of crushed stone of Size No. 7 was sprayed on the coated surface at an angle of 45° at a temperature of −20° C. and at an air pressure of 0.3 MPa so that the coated film might be given an impact. Next, adhesive tape was attached to said coated surface, and, then, was abruptly peeled off, and, thus, there was examined the state of peeling of the coated film around the chips caused by the impact.

The meaning of the marks is as follows:

o: Peeling of coated film is not or hardly seen around the chips.

X: Peeling of coated film is remarkably noticeable around the chips.

Corrosion resistance:

A gravelometer (made by Q-PANEL CO., LTD. ) was used as a tester, and 500 g of crushed stone of Size No. 6 was sprayed on the coated surface at an angle of 90° at a temperature of −20° C. and at an air pressure of 0.4 MPa so that the coated film might be given an impact. Next, a corrosion resistance test was conducted (for 120 hours) according to JISK 5400-7.8, and, thus, there was examined the occurrence of rust.

The meaning of the marks is as follows:

o: Occurrence of rust is slightly seen.

X: Occurrence of rust is remarkably noticeable around the chips.

Weatherability:

After being placed under Sunshine Weatherometer for 2000 hours, the coated film was dipped in warm water at a temperature of 40° C. for 10 days, and, after the coated film was dried, there was carried out a tape peeling test.

The meaning of the marks is as follows:

o: Peeling of coated film is not seen at all.

X: Peeling of coated film is remarkably noticeable.

What is claimed is:

1. A process of forming a coated film which consists essentially of applying a cationically electrodeposition paint on a metallic article to be coated and then heat curing; coating the surface of the resulting electrodeposition coated film with an aqueous primer which is composed of a thermoplastic polyurethane resin produced by subjecting a carboxyl group-containing urethane prepolymer to chain extension in the presence of an aqueous medium; coating the resulting uncured film of said aqueous primer with an aqueous base paint; then coating the resulting uncured coated film of the aqueous base paint with a clear paint; and heat curing the resulting three-layer coated films of aqueous primer, aqueous base paint and clear paint at the same time.

2. The process of claim 1 wherein the aqueous primer is composed of a self-emulsifying urethane emulsion which is obtained by subjecting a free isocyanate group-containing urethane prepolymer to chain extension by use of water and to emulsification after or while neutralizing said urethane prepolymer with a tertiary amine, said urethane prepolymer being produced by allowing a) at least one isocyanate selected from the group consisting of aliphatic and alicyclic diisocyanates, b) at least one diol selected from the group consisting of polyether diols and polyester diols each having a number average molecular weight of 500 to 50,000, c) a polyhydroxy compound having a number average molecular weight of less than 500, and d) a dimethylol alkanoic acid to react with one another so that NCO/OH equivalent ratio falls within the range of 1.1/1 to 1.9/1.

3. The process of claim 2 wherein the aliphatic and alicyclic diisocyanates are selected from the group consisting of an aliphatic diisocyanate which has 4 to 14 carbon atoms not including the carbon atoms in the isocyanate group, an alicyclic diisocyanate which has 5 to 20 carbon atoms not including the carbon atoms in the isocyanate group and carbodiimide, ureidodione and ureidoimine derivatives of these diisocyanates.

4. The process of claim 2 wherein the aliphatic and alicyclic diisocyanates are selected from the group consisting of hexamethylene diisocyanate, 2,2,4-trimethylhexane diisocyanate, lysine diisocyanate, 1,4-cyclohexane diisocyanate, 1-isocyanate-3-isocyanate methyl-3,5,5-trimethylcyclohexane (isophoronediisocyanate), 4,4'-dicyclo-hexylmethane diisocyanate, methylcyclohexylenediisocyanate, isopropylidene cyclohexyl-4,4'-diisocyanate, and carbodiimide-, ureidodione- and ureidoimine-derivatives of these diisocyanates.

5. The process of claim 2 wherein the diisocyanates are selected from the group consisting of 1,4-cyclohexane diisocyanate, 1-isocyanate-3-isocyanate methyl-3,5,5-trimethyl-cyclohexane and 4,4'-dicyclohexylmethane-diisocyanate.

6. The process of claim 2 wherein the polyether diol and polyester diol each have a number average molecular weight in the range of 1000 to 30000.

7. The process of claim 2 wherein the polyether diol is selected from the group consisting of polyethylene glycol, polypropylene glycol, block or random polyethylene-propyleneglycol, polytetramethylene ether glycol, polyhexa-methylene ether glycol and polyoctamethylene ether glycol.

8. The process of claim 2 wherein the polyester diol is selected from the group consisting of polyethylene adipate, polybutylene adipate, polyhexamethylene adipate, polyneopentyl adipate, poly-3-methylpentyl adipate, polyethylene/butylene adipate and polyneopentyl/hexyl adipate.

9. The process of claim 2 wherein the low molecular weight polyhydroxy compound has a number average molecular weight of less than 500, and has 2 to 10 hydroxyl groups in one molecule.

10. The process of claim 2 wherein the polyhydroxy compound is selected from the group consisting of glycols, adducts of alkylene oxide, trihydric alcohol and adducts of trihydric alcohol with alkylene oxide.

11. The process of claim 2 wherein the dimethylol alkanoic acid is selected from the group consisting of di-methylol acetic acid, dimethylol propionic acid and dimethylol butyric acid.

12. The process of claim 2 wherein the dimethylol alkanoic acid is dimethylol propionic acid.

13. The process of claim 2 wherein the dimethylol alkanoic acid is used in such an amount that the amount of carboxylic group in the formed prepolymer may be within the range of 0.5 to 5% by weight based on the urethane prepolymer.

14. The process of claim 2 wherein the tertiary amine is selected from the group consisting of trialkyl amine, N-alkylmorpholine and N,N-dialkyl alkanol amine.

15. The process of claim 2 wherein the tertiary amine is tri($C_1$–$C_{10}$ alkyl)amine.

16. The process of claim 2 wherein the tertiary amine is used for neutralization at a proportion of 0.5 to 1 equivalent per equivalent of carboxylic group based on the dimethylol alkanoic acid.

17. The process of claim 1 wherein the aqueous primer is applied by spray coating.

18. The process of claim 1 wherein the thickness of the coated film of aqueous primer is in the range of 1 to 20µ based on the heat cured film.

19. The process of claim 1 wherein the aqueous base paint is composed of areinc acrylic resin, areinc alkyd resin or areinc polyester resin thermo-setting resin composition.

20. The process of claim 1 wherein the aqueous base paint is applied by spray coating.

21. The process of claim 1 wherein the thickness of the coated film of aqueous base paint is in the range of 5 to 30µ based on the heat cured film.

22. The process of claim 1 wherein the aqueous primer and the aqueous base paint are applied by wet-on-wet coating, and wherein both of the resulting coated films are then heated to a temperature of 60° to 100° C., and are thereby dried simultaneously.

23. The process of claim 1 wherein the clear paint is composed of areinc acrylic resin, amino alkyd resin or areinc polyester resin thermo-setting resin composition, and forms a colorless or colored coated film.

24. The process of claim 1 wherein the clear paint is applied by spray coating.

25. The process of claim 1 wherein the thickness of the coated film of clear paint is in the range of 30 to 50µ based on the heat cured film.

26. The process of claim 1 wherein, after the clear paint is applied, the three layers of coated films composed of aqueous primer, aqueous base paint and clear paint are heated to a temperature of 120° to 150° C., and are thereby cured simultaneously.

27. Articles coated by the process of claim 1.

28. The coated article of claim 27 which is an automobile body.

* * * * *